(No Model.)

S. G. RANDALL.
ATTACHMENT FOR COOKING VESSELS.

No. 259,718. Patented June 20, 1882.

WITNESSES

INVENTOR
S. G. Randall
By his Attorneys

UNITED STATES PATENT OFFICE.

SILAS G. RANDALL, OF GREENE, NEW YORK, ASSIGNOR TO AMELIA A. RANDALL, OF SAME PLACE.

ATTACHMENT FOR COOKING-VESSELS.

SPECIFICATION forming part of Letters Patent No. 259,718, dated June 20, 1882.

Application filed February 14, 1882. (No model.)

*To all whom it may concern:*

Be it known that I, SILAS G. RANDALL, of Greene, in the county of Chenango and State of New York, have invented an Improved Attachment for Cooking-Vessels, of which the following is a specification.

The fumes from cooking frequently pervade the entire atmosphere of a house, rendering it offensive, uncomfortable, and perhaps even unhealthy for very sensitive persons, and when much boiling is being done the air becomes saturated with moisture and dampens the walls.

The object of my invention is to provide means for carrying off and preventing the escape of such fumes or vapors, and thus keep the atmosphere pure. This I accomplish by the simple, economical, and readily-adjustable device illustrated in the accompanying drawings, in which—

Figure 1:
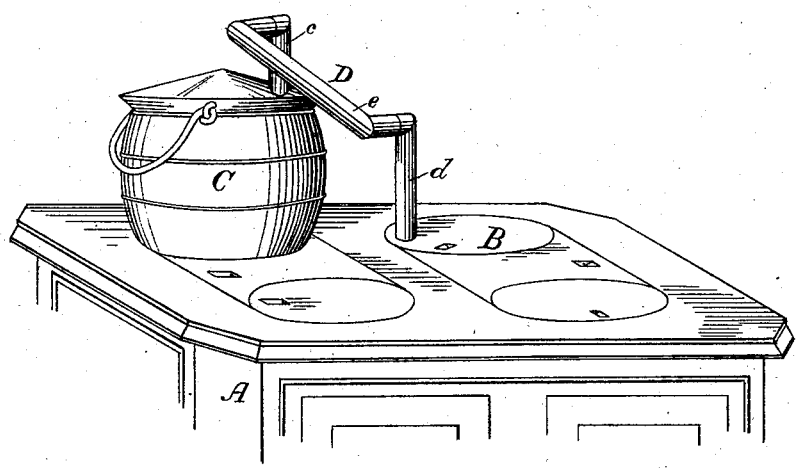
Figure 2:
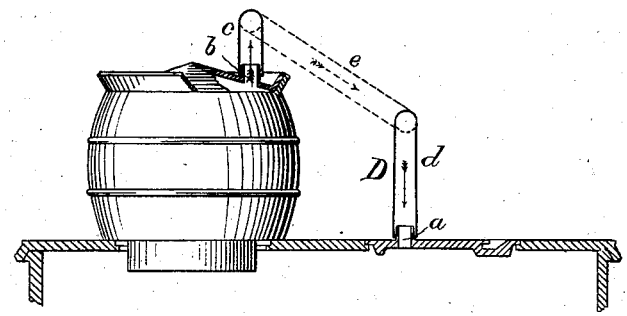
Figure 3:
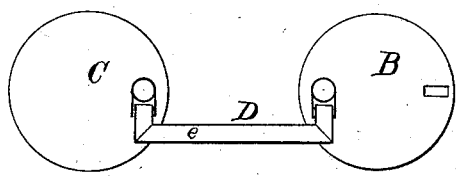

Figure 1 is a perspective view of the top of a stove with a boiling-pot thereon, showing the manner of applying my invention. Fig. 2 is a sectional view, showing the manner of connecting the several parts together; and Fig. 3 is a sectional plan view, showing the manner of joining or hinging the pipes.

A is the stove; B, the stove-lids; C, a boiling-pot occupying the place of one of the lids. *a* is a nipple formed near the edge of one of the lids B, and *b* is a nipple formed near the edge of the pot-cover E.

A sectional jointed or hinged pipe, D, the upright parts *c d* of which fit over the nipples *a* and *b*, places the interiors of the pot and stove in communication, so that the steam or vapors from cooking will be drawn by the draft into the stove and carried away.

The upright sections *c d* and the cross-section *e* may be jointed in any suitable manner. They are shown as connected by elbows on the pipe *e*, which fit snugly into elbows on the pipes *c d*. This construction is preferred, as it permits the separation of the parts for cleaning. The pipes may, however, be permanently united by forming a bead on one of the elbows and spinning the other down over it. The sectional pipe may thus be adjusted vertically to adapt it to low flat vessels—like pans—or to higher vessels or pots.

In order to give the necessary lateral adjustment to suit covers of vessels of various sizes, stoves of different sizes, and vessels on different parts of the stove, I place the nipples eccentrically on the stove-lid and vessel-cover, so that by turning them the parts may be brought into proper relation.

The device is simple, is readily adaptable to any stove and vessel, and is very efficient for the purpose designed.

Having thus described my invention, what I claim is—

1. The combination, substantially as set forth, of the vessel-cover, the stove-lid, and the connecting-pipe hinged to flex vertically, for the purpose set forth.

2. The combination of the vessel-cover, the stove-lid, and a connecting-pipe eccentrically connected with the lid and cover, substantial'y as described.

3. The combination of the vessel-cover, the stove-lid, and the hinged connecting-pipe, which fits over the nipples placed eccentrically on the cover and lid, substantially as described.

4. The stove-lid formed with a nipple for the reception of the pipe D, substantially as and for the purpose set forth.

In testimony whereof I have hereunto subscribed my name this 9th day of February, A. D. 1882.

S. G. RANDALL.

Witnesses:
NELLIE L. HOLMES,
E. C. DAVIDSON.